3,021,362
PURIFICATION OF CRUDE ALKYLIDENE BIS-(BENZOIC ACIDS) BY SOLVENT EXTRACTION
John C. Petropoulos, Norwalk, Conn., assignor to American Cyanamid Company, New York, N.Y., a corporation of Maine
No Drawing. Filed June 5, 1958, Ser. No. 739,983
12 Claims. (Cl. 260—525)

This invention relates to a commercially feasible method for producing a technical grade of alkylidene bis-(benzoic acids) of the type hereinafter defined from the crude reaction products obtained by the nitric acid oxidation of the corresponding ditolylalkanes.

The production of alkylidene bis-(benzoic acids) of the formula

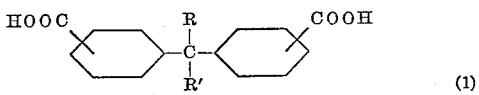

in which R is methyl or ethyl and R' is an alkyl hydrocarbon group containing from 1 to 4 carbon atoms by the chemical oxidation of the corresponding ditolylalkanes of the formula

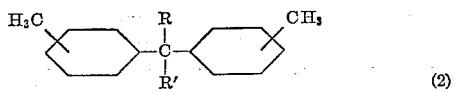

in which R and R' are as defined above is described in the copending application of John C. Petropoulos, Serial No. 523,355, filed July 20, 1955, now U.S. Patent No. 2,848,486. Typical procedures described in this patent include the oxidation of 2,2-di-(4-tolyl) butane to 4,4'-(2,2-butylidene) dibenzoic acid, the oxidation of 2,2-di-(4-tolyl) propane to 4,4'-isopropylidenedibenzoic acid, the oxidation of 2,2-di-(4-tolyl) pentane to 4,4'-(2,2-pentylidene) dibenzoic acid and the oxidation of 3,3-di-p-tolyl-pentane to 4,4'-(3,3-pentylidene) dibenzoic acid.

When the oxidation of these and other similar ditolylalkanes of the class defined by Formula 2 is carried out using nitric acid as the oxidizing agent the crude oxidation products from the reaction contain only about 80–85% of the desired dicarboxylic acids of Formula 1. These crudes have a combined nitrogen content of about 1%, indicating that a considerable proportion of the impurities are nitration products such as nitro and nitroso compounds. It is a principal object of the present invention to provide a relatively cheap and commercially useful method for removing these nitrogen-containing impurities in order to produce technical grades of the acids.

I have found that the nitrogen-containing impurities can be removed from the crude alkylidene bis-(benzoic acids) of Formula 1 produced by nitric acid oxidation by extracting these crude acids with mononuclear aromatic hydrocarbon solvents such as benzene, toluene, xylenes and xylene mixtures, mesitylene and the like. Although any aromatic solvent of this class may be used benzene and particularly toluene are preferred since they are cheap and available in large quantities. The mononuclear aromatic hydrocarbon solvents and particularly benzene and toluene have been found to combine a good solvent action on the nitrogen-containing impurities with a relatively low solvent power on the alkylidene bis-(benzoic acids) and therefore permit adequate purification with minimum losses of the product acids in the solvent. The preferred process of my invention is therefore carried out by suspending the crude acid in the selective solvent, bringing the nitrogen-containing impurities into solution therein and filtering. This procedure may be repeated several times if desired until a product acid having the desired degree of freedom from nitrogen-containing impurities is obtained.

The optimum ratio of toluene, xylene, benzene or other mononuclear aromatic hydrocarbon solvent to crude alkylidene bis-(benzoic acid) may vary with the content of nitrogen-containing impurities in the crude acid but will depend primarily on the extraction temperatures used. When the crudes are extracted at elevated temperatures on the order of 70°–120° C. or higher good results are obtainable using about 1–3 parts by weight of solvent for each part of the crude but larger proportions up to about 4–6:1 may be preferable when the extraction is carried out at lower temperatures. The alkylidene bisbenzoic acids have a low solubility in the mononuclear aromatic hydrocarbons at temperatures up to 120° C. as well as at room temperature and below, and therefore the slurries may be filtered at any desired temperature.

The solvent extraction process of the invention will convert the 80–85% crudes obtained by the nitric acid oxidation of the ditolylalkanes of Formula 2 to technical grades containing about 95% or more of the corresponding alkylidene bis-(benzoic acids) of Formula 1. These products are substantially free from nitro, nitroso and other combined nitrogen-containing materials but may contain small quantities of other oxidation products such as benzophenone dicarboxylic acids, terephthalic acid and the like. However, small proportions of these and similar compounds are not objectionable in a technical grade product since they are relatively heat-stable dicarboxylic acids which will take part in an alkyd resin-forming reaction. The alkylidene bis-(benzoic acids) purified by the process of the invention may therefore be reacted with glycerol, pentaerythritol and other polyhydric alcohols, with or without admixture with other dicarboxylic acids such as phthalic anhydride and higher fatty acids such as lauric and stearic acids to form alkyd resins when a resin having a relatively dark color is not objectionable. They are also well suited for further purification to light colored acids capable of producing alkyd resins having colors as low as 2–3 on the Gardner-Holdt scale by the procedures described in the copending applications of John C. Petropoulos and Henry F. Lederle, Serial Nos. 739,984 and 739,985, filed concurrently herewith.

The process of the invention will be further described and illustrated by specific examples which describe the preparation and purification of crude 2,2-butylidene bis-(p-benzoic acid), isopropylidene bis-(p-benzoic acid) and 3,3-pentylidene bis-(p-benzoic acid). It should be understood, however, that although these examples may describe certain of the more specific features of the invention they are given primarily for purposes of illustration and that the procedures embodied therein may be applied to other crudes of the class defined above.

Example 1

Crude 2,2-butylidene bis-(p-benzoic acid) is prepared by the following procedure. An autoclave is charged with 105 parts of 1,1-di-(p-tolyl) ethane, 5 parts of metallic sodium and 1.5 parts of o-toluic acid, purged with nitrogen gas and sealed. It is then heated to about 170° C., the pressure is released, and 11.8 parts of ethylene are introduced; the pressure is then about 900 p.s.i. The temperature is maintained at about 170° C. with intermittent additions of ethylene until no further pressure drop is noted, which requires about 6 hours, after which it is cooled. The reaction products are removed, filtered, washed with hexane and distilled. The product is 2,2-di-(p-tolyl) butane having a purity of about 99.5%.

A portion of this product amounting to 69.6 parts by weight is added to an autoclave previously charged with 440 parts of 25% nitric acid. The autoclave is heated to about 150° C. and maintained under a pressure of about 200 p.s.i.g. or higher by gradual addition of the di-(p-tolyl) butane; the gas which is vented off contains CO, $CO_2$ and oxides of nitrogen. When the reaction is completed the solid oxidation product is filtered off and washed with water. It contains about 80% by weight of 2,2-butylidene bis-(p-benzoic acid) together with other oxidation products including small quantities of terephthalic acid and benzophenone dicarboxylic acids and nitroso and nitro compounds such as picric acid in amounts such that its content of combined nitrogen is about 1%.

*Example 2*

A 500 gram portion of a crude 2,2-butylidene bis-(p-benzoic acid) prepared by the process of Example 1 and having a purity of about 80% and a combined nitrogen content of 0.9% was charged into a reaction flask equipped with a reflux condenser and stirrer and twice its weight of toluene was added. The mixture was heated to boiling and refluxed with agitation for four hours and was then cooled and filtered. The solids were again suspended in twice their weight of toluene and refluxed with agitation for four hours and again separated by filtration. The dried solids weighed 425 grams and had a combined nitrogen content of less than 0.1%. Analysis of a sample showed that the nitro nitrogen, which constitutes about one-third of the total nitrogen in the original crude, was reduced to about 0.03%.

Similar results are obtained when benzene, xylene or other aromatic hydrocarbon solvents are used instead of toluene or in admixture therewith. The solvent removes the majority of the nitrogen-containing compounds and also reduces the content of partial oxidation products but the extracted acid produces colored resins.

*Example 3*

Another portion of the crude product of Example 1 weighing 100 grams was extracted by suspending it in 500 ml. of benzene, warming the suspension to 30°–40° C. with agitation, cooling and filtering. After a total of three extractions and filtrations by this procedure the recovered solid product was dried. It weighed 85 grams and contained 0.08% of combined nitrogen.

*Example 4*

An autoclave was charged with 23.8 parts by weight of 2,2-di-(p-tolyl) propane, 30.6 parts of concentrated nitric acid and 61 parts of water and heated to 160° C. The reaction mixture was held at 170°–190° C. for 30 minutes and was then cooled to room temperature. The oxidation product was a crude isopropylidene bis-(p-benzoic acid) having a combined nitrogen content of about 1%. A sample of this material weighing 9.85 grams was extracted three times by suspending it in 50 ml. of benzene, warming to 30°–40° C., cooling and filtering. The dried filter cake from the third extraction was essentially free from nitrogen-containing impurities.

*Example 5*

A charge of 25.2 parts by weight of 3,3-di-p-tolyl-pentane, 30.6 parts of concentrated nitric acid and 61 parts of water was heated in an autoclave at about 175°–190° C. for one hour and then cooled and the crude reaction product was recovered by filtration. A 15 gram sample of this product containing about 1% of combined nitrogen was suspended in 40 ml. of toluene and the suspension was boiled for one hour under a reflux condenser and then cooled and filtered. The filter cake was slurried with 30 ml. of toluene and the mixture was again refluxed 30 minutes. After cooling, filtering and drying the solid 3,3-pentylidene bis-(p-benzoic acid) weighed 13 grams and contained about 0.1% of nitrogen.

What I claim is:

1. A method of removing nitrogen-containing impurities from a crude alkylidene bis-(benzoic acid) prepared by the nitric acid oxidation of a ditolylalkane of the formula

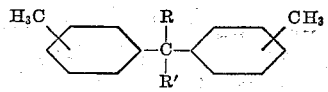

in which R is an alkyl radical containing from 1 to 2 carbon atoms and R' is an alkyl radical containing from 1 to 4 carbon atoms which consists in: extracting said crude with a mononuclear aromatic hydrocarbon solvent and thereby dissolving said nitrogen-containing impurities while retaining the alkylidene bis-(benzoic acid) as a solid therein and then filtering the resulting suspension.

2. A method according to claim 1 in which the solvent is toluene.

3. A method according to claim 1 in which the solvent is benzene.

4. A method according to claim 1 in which the solvent is xylene.

5. A method of removing nitrogen-containing impurities from a crude alkylidene bis-(benzoic acid) prepared by the nitric acid oxidation of a ditolylalkane of the formula

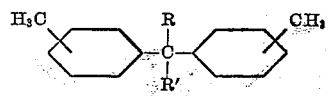

in which R is an alkyl radical containing from 1 to 2 carbon atoms and R' is an alkyl radical containing from 1 to 4 carbon atoms which consists in: boiling a suspension of said crude in a mononuclear aromatic hydrocarbon solvent and thereby dissolving said nitrogen-containing impurities while retaining the alkylidene bis-(benzoic acid) as a solid therein and then filtering the resulting suspension.

6. A method according to claim 5 in which the solvent is toluene.

7. A method of removing nitrogen-containing impurities from a crude 2,2-butylidene bis-(p-benzoic acid) prepared by the nitric acid oxidation of a 2,2-di-p-tolyl-butane which consists in: extracting said crude with a mononuclear aromatic hydrocarbon solvent and thereby dissolving said nitrogen-containing impurities while retaining the 2,2-butylidene bis-(p-benzoic acid) as a solid therein and then filtering the resulting suspension.

8. A method according to claim 7 in which the solvent is toluene.

9. A method according to claim 7 in which the solvent is benzene.

10. A method according to claim 7 in which the solvent is xylene.

11. A method of removing nitrogen-containing impurities from a crude 2,2-butylidene bis-(p-benzoic acid) prepared by the nitric acid oxidation of a 2,2-di-p-tolyl-butane which consists in: boiling a suspension of said crude in a mononuclear aromatic hydrocarbon solvent and thereby dissolving said nitrogen-containing impurities while retaining the 2,2-butylidene bis-(p-benzoic acid) as a solid therein and then filtering the resulting suspension.

12. A method according to claim 11 in which the solvent is toluene.

References Cited in the file of this patent

UNITED STATES PATENTS

| | | |
|---|---|---|
| 2,610,191 | Toland | Sept. 9, 1952 |
| 2,785,198 | Grosskinsky et al. | Mar. 12, 1957 |
| 2,819,300 | Grosskinsky et al. | Jan. 7, 1958 |
| 2,836,579 | Schweitzer | May 27, 1958 |

OTHER REFERENCES

Fischer et al.: Ber., vol. 37, p. 3216 (1904).